United States Patent [19]

Eller et al.

[11] 4,156,262

[45] May 22, 1979

[54] OVERLOAD-PROTECTION CIRCUIT FOR ELECTRIC MOTORS

[75] Inventors: Fritz-Dieter Eller, Essen; Günter Fröhlich, Ennepetal, both of Fed. Rep. of Germany

[73] Assignee: Eller & Co., Vertriebs- und Ingenieursbüro, Essen, Fed. Rep. of Germany

[21] Appl. No.: 875,078

[22] Filed: Feb. 3, 1978

[30] Foreign Application Priority Data

Feb. 5, 1977 [DE] Fed. Rep. of Germany ....... 2704820

[51] Int. Cl.² .............................................. H02H 7/08
[52] U.S. Cl. ....................................... 361/28; 361/31; 361/93; 361/94
[58] Field of Search ........................ 361/24, 29, 30, 31, 361/32, 93, 94, 96, 97, 87

[56] References Cited

U.S. PATENT DOCUMENTS

| | | |
|---|---|---|
| 3,296,495 | 1/1967 | Paddison ............................ 361/93 X |
| 3,544,846 | 12/1970 | Thompson ............................ 361/94 |
| 3,845,373 | 10/1974 | Totsu et al. ........................ 361/31 X |

*Primary Examiner*—Harry E. Moose, Jr.
*Attorney, Agent, or Firm*—Karl F. Ross

[57] ABSTRACT

An overload-protection circuit for an electric motor has a current transformer whose primary winding is connected in series with the windings of the motor to be protected while two secondary windings are provided. The first secondary winding is connected to an actual-value current-monitoring circuit while the second secondary winding forms part of a voltage-supply network for the circuit. The primary winding is subdivided into a plurality of winding sections having respective taps for different nominal values of the overload current. The product of the number of turns of each winding section and the nominal-current value of the respective tap (ampere-turns) is the same for each winding and the respective tap.

13 Claims, 1 Drawing Figure

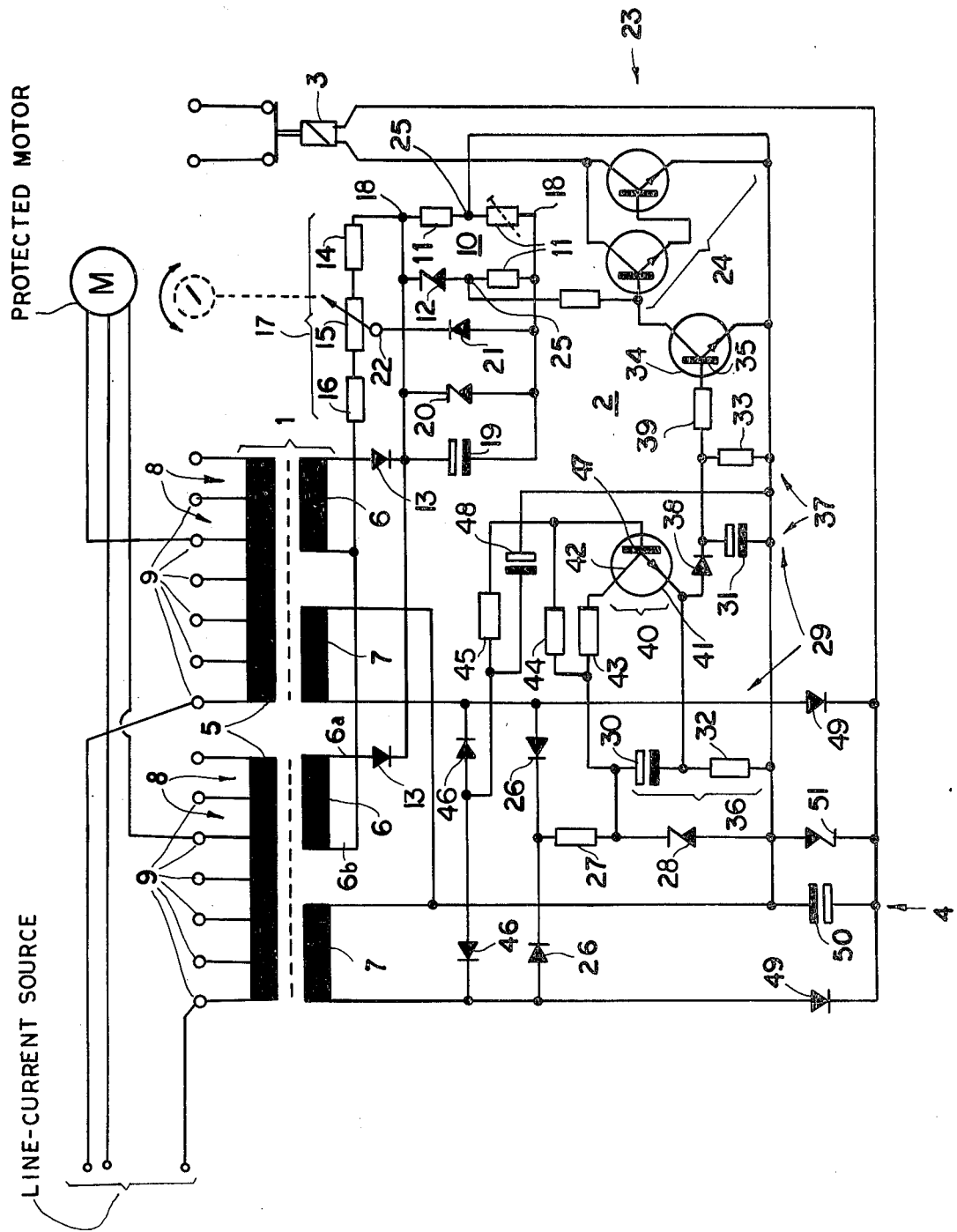

OVERLOAD-PROTECTION CIRCUIT FOR ELECTRIC MOTORS

FIELD OF THE INVENTION

The present invention relates to an overload-protection circuit for an electric motor and, more particularly, to a circuit capable of disconnecting an alternating current motor from a line-current source upon the development of a current in excess of a predetermined nominal value.

BACKGROUND OF THE INVENTION

It is known, in providing protective circuitry for an alternating current electric motor, to provide means responsive to the current traversing a winding thereof and operating a switch or other device for open-circuiting the motor upon the development of a current whose actual value exceeds a predetermined nominal value assigned to the circuit by the dimensioning of the circuit elements thereof.

Such an overload-protective circuit can include a current transformer whose primary winding is connected in series with the motor winding to be protected and the line-current source. The transformer also has a secondary winding which forms part of an actual-value current-monitoring circuit or a voltage-supply network for the circuit.

Such a circuit arrangement has been described, for example, in German published application (Auslegeschrift) DT-AS No. 15,88,896, the circuit of which responds to both fault currents and currents exceeding a nominal value, i.e. a current overload. In this circuit, two current transformers are provided whose primary windings are each connected to the terminals of the motor, i.e. to the respective phase terminals of a polyphase motor or to the neutral point and one or more phase terminals.

In the secondary winding of the first current transformer, a secondary current is induced which is a function of the sum of the primary current in the phase windings and at the neutral terminal.

The secondary of the second current transformer comprises three secondary windings corresponding to the phase windings of the motor and connected in a star configuration. The current induced in these secondary windings is converted into a voltage so that these secondary windings serve in part as a voltage supply network. The secondary windings of the two current transformers are separate from one another.

As noted previously, such a circuit must be designed specifically for each nominal value of the maximum current for each electric motor with which the circuit is to be associated. In other words, one cannot use one and the same circuit for motors having different nominal current values. This poses a problem since the protective circuitry must be redesigned for each nominal current of motors with which they may be used and a large number of different protective circuits with different nominal values may have to be stocked if service is required for a variety of different capacity motors.

U.S. Pat. No. 3,544,846 describes an overload circuit in which two current transformers are provided in cascade and the effective number of turns of the primary winding of the second transformer can be varied. This, however, only allows compensation for the relay which is to be operated by the circuit to disconnect the motor and even this circuit has not been found to be effective for use with a large number of different capacity motors with different nominal currents.

OBJECTS OF THE INVENTION

It is an object of this invention to provide an improved overload-protective circuit for an electric motor whereby the above-mentioned disadvantages can be obviated and the circuit can be used with any one of a variety of motors having different nominal maximum currents.

SUMMARY OF THE INVENTION

This object and others which will become apparent hereinafter are attained, in accordance with the present invention, in an overload-protective switch which comprises a current transformer having at least one primary winding in series with a winding of a motor to be protected, two secondary windings inductively coupled to the primary winding an actual-value current-monitoring circuit connected to a first of these secondary windings, means responsive to the actual-value current-monitoring circuit for open-circuiting the motor upon the development of a current through the primary winding in excess of a nominal current assigned to the motor, and means forming a voltage-supply network with the second secondary winding for operating the last-mentioned means for open-circuiting the motor.

In this circuit arrangement, the invention provides that the primary winding of the current transformer is subdivided into a multiplicity of winding sections with respective numbers of turns, each section being provided with a tap having a respective nominal-current value to which a motor winding can be connected for the protection of the motor at this nominal-current value. It is essential to the present invention that the ampere-turn relationship be equal for all of the sections, i.e. that the product of the nominal-current value of the respective tap and the number of turns of the associated section be the same (constant) for all sections.

In the system of the present invention, therefore the primary winding is tapped and each tap and the associated section has assigned to it a respective nominal-current value which differs from tap to tap, preferably in steps, to accommodate electric motors with a wide range of completely different nominal maximum currents.

Preferably, the primary winding is constructed and arranged so that it has taps of nominal-current values corresponding to 0.5 A, 1 A, 2 A, 4 A, 8 A and 16 A so that, without any further adjustability the circuit can be used for the prevention of overloads in electric motors with nominal maximum currents between 0.5 A and 16 A, it being understood that the motor must always be connected to the appropriate current tap.

This arrangement ensures that the signal obtained at each of the secondary windings of the current transformer will be the same for a given ratio of the actual primary current to the nominal value of the selected tap. For example, when the motor is connected to the one ampere tap and is traversed by a current of 0.9 A, the signal obtained for the secondary winding of the actual-value current-monitoring circuit will be the same as that obtained when the 2 A tap is traversed by a current of 1.8 A. The result is the same for both secondary windings of the transformer.

According to a feature of the invention, the current transformer has a substantially linear relationship between the field strength and the induction over a variation in the primary current of 50% to 100% of the respective nominal value. When the taps have nominal-current values in the ratio of 1:2, this range of linearity ensures that the circuit can be used for current-overload protection with nominal maximum currents between 0.5 times the nominal value of the lowest tap to 1.0 times the nominal value of the maximum tap.

According to another feature of the invention, the current-monitoring circuit comprises a bridge network of three bridge resistors and a Zener diode. In addition, this circuit includes a rectifier diode and a resistance network in series therewith and constituting a voltage divider connected to the input terminals of the bridge. The bridge can also include a potentiometer which can provide fine control of the nominal-current value at which the circuit will decouple the motor from the line current source.

A coupling diode may also be provided between one terminal of the bridge and the potentiometer.

The bridge circuit allows the output side of the current monitor to be a control transistor or a Darlington circuit, the control stretch of which is shunted by the emitter-collector circuit of another transistor. This ensures enabling of the disconnect operation of the circuit only when a sufficient voltage is also applied.

The invention also includes means for disabling the current-monitoring circuit, e.g. via a transistor and associated time-constant networks, for a predetermined period corresponding to the startup base of the motor during which currents are drawn which exceed the nominal maximum running current.

In addition, the circuit includes means for rapidly draining the time-constant capacitor which disables the overload circuitry so that effective operation of the overload circuitry is restored as rapidly as possible.

Finally, the voltage supply circuit advantageously includes a storage capacitor connected by a rectifier diode to the second secondary winding of the current transformer and a Zener diode bridged across this capacitor.

BRIEF DESCRIPTION OF THE DRAWING

The above and other objects, features and advantages of the present invention will become more readily apparent from the following description, reference being made to the sole FIGURE of the drawing which is a circuit diagram of an overload-prevention circuit for an electric motor.

SPECIFIC DESCRIPTION

The drawing shows an overload-prevention protective circuit for an electric motor and especially for a polyphase alternating current motor having two monitored phases. As a result, two current transformers 1 are provided, these current transformers having the same structure and function similarly for the respective phases so that only one will have to be described in detail.

A. OVERVIEW OF CIRCUIT

The overload circuit of the present invention comprises, in addition to the current transformers 1, a monitoring circuit 2 which detects the actual value of the current, i.e. an actual-value current-detecting circuit 2, an overload preventing switch or relay 3 which is energized to decouple the motor from the line-current source, and a voltage-supply circuit 4.

1. CURRENT TRANSFORMERS

The current transformers 1 each having a primary winding 5 and two secondary windings 6 and 7. The actual-value current-monitoring circuit 2 is connected to the first secondary winding 6 of each current transformer while the second secondary winding 7 of each transformer forms part of the voltage-supply circuit 4.

In accordance with an important feature of the invention, the primary winding 5 is subdivided into a multiplicity of sections 8, each provided with a tap 9 in the form of a terminal which can be connected in circuit with the motor winding.

Each section 8 has a number of turns such that the product of the number of turns of the respective section of the winding for nominal value of the current associated with the reference tap 9 is a constant value for all sections and taps.

Consequently, the primary winding 5 of each current transformer 1 is subdivided into a plurality of distinct current-value sections 8, each of which is associated with a tap 9 of a given nominal current so that the circuit can be used to provide overload protection for electric motors with a wide range of different nominal-current demands.

For example, the primary winding 5 can have taps 9 corresponding to the nominal current values of 0.5 amp, 1 amp, 2 amps, 4 amps, 8 amps and 16 amps. The overload circuitry can then be used without further modification for the protection of electric motors with nominal currents between 0.5 amps and 16 amps. Naturally for each motor, the respective current tap 9 must be used to connect the corresponding portion of the primary winding in series with respective motor windings to the line-current source.

2. ACTUAL-VALUE CURRENT-MONITORING CIRCUIT

In the protective circuit of the present invention, the voltage required for the actual-value current-monitoring circuit 2 and the overload-preventing switch 3 is derived from the current flowing in the primary of the respective transformer. Consequently, each current-value section 8 of the primary winding 5 has such a number of turns that the product of this number of turns and the nominal current associated with the respective tap 9 is constant for any section and the associated tap. Thus the secondary windings 6 and 7 of each transformer 1 do not "notice" any difference whether a section 8 with a tap 9 for one ampere (nominal value) is traversed by a primary current of for example 0.9 amp or whether instead section 8 with its associated tap 9 of a nominal value of 2 amperes is traversed by a primary current of 1.8 amperes. The result is the same for the actual-value monitoring circuit 2 (fed by the first secondary winding 6 of the current transformer 1) and for the voltage supply circuit 4 (supplied by the secondary winding 7 of the current transformer 1).

Advantageously, the current transformer 1 is so constructed that with a primary current from 50% to 100% of the respective nominal current through the appropriate section 8 and tap 9, there is a substantially linear relationship between the field strength on the one hand and the induction on the other. This will result in a continuous range of overload protection without discontinuity, for electric motors whose nominal current can vary between 50% and 100% of the respective nominal current of the corresponding terminals 9. By a stepping of the nominal current values of the taps in a ratio of 1:2, the overload circuitry of the present invention can be used to protect electric motors whose nominal current lies between 0.5 times the nominal current of the lowest terminal of tap 9 and 1.0 times the nominal current of the highest-value terminal or tap 9.

The actual-value current-monitoring circuit 2 comprises a bridge network 10 of three bridge resistors 11 and a Zener diode 12. More specifically, the terminal 6a of each current transformer secondary 6 can be connected through a rectifying diode in series with one diagonal of the bridge 10 corresponding to the junction between the Zener diode 12 and one of the resistors 11. The opposite terminal 6b of the secondary winding 6 is connected through a voltage divider or resistance network 17 to this terminal. A storage capacitor 19 lies between the other diagonal of the bridge and the rectifier 13.

The voltage divider or resistance network 17 consists of a plurality of series-connected resistors 14, 15 and 16 connected, in turn, in series with the rectifier diodes 13 and the bridge 10. The other bridge terminal is also connected to the junction of the rectifier diodes 13 and the capacitor 19, by a Zener diode 20 so that this Zener diode is connected in shunt across or in parallel with the storage capacitor.

A coupling diode 21 is tied between a terminal 22 of the wiper of the potientiometer 15 which forms one of the resistors 14 through 16 of the resistance network 17 and the other terminal of the bridge 10, i.e. the terminal connected to the opposite side of the junction between the storage capacitor 19 and the Zener diode 20.

The input terminals 18 of the bridge network 10 are thus connected, one to the end of the resistance network 17 to which the rectifier diodes 13 are connected and the other to the coupling diode which is in series with the wiper terminal 22 of the potientiometer 15.

In addition, the actual-value current-monitoring circuit 2, instead of using a simple transistor in the output stage as is also possible, preferably makes use of a bootstrap circuit of the Darlington type as represented at 23 (see PULSE, DIGITAL AND SWITCHING WAVEFORMS, McGraw-Hill Book Co. 1965, pages 562 ff, and 576 ff), the control stage 24 of the Darlington circuit 23 being connected to the output terminals 25 of the bridge circuit 10.

3. DELAY CIRCUITS

In the preferred embodiment of the present invention illustrated in the drawing, the overload-prevention, motor-protection circuit also comprises a rectifier diode 26, a current-limiting resistor 27, a Zener diode 28 and a delay network 29 consisting of time-constant capacitors 30, 31 and the associated resistors 32 and 33 which form the respective RC timing-constant couplings. An auxiliary transistor 34 is also provided.

The rectifier diode 26, the current-limiting resistor 27 and the Zener diode 28 are connected in series, this series network being connected to the second secondary winding 7 of the current transformer 1.

The base 35 of the auxiliary transistor 34 is connected via the time-delay network 29 to the junction between the current-limiting resistor 27 and the Zener diode 28.

When the transistor 34 is conductive, the overload-preventing switch or relay 3 cannot respond since, in this circuit, the conductive state of the transistor 34 short-circuits the control path 24 of the Darlington circuit 23.

The delay network 29 has two time-delay stages 36 and 37, the first delay stage 36 including the time-constant capacitor 30 and the time-constant resistor 32 connected in series therewith (first delay capacitor and first delay resistor respectively). The second delay stage 37 comprises a second delay capacitor 31 and a second delay resistor 33, connected in parallel therewith.

The second time-delay stage 37 is connected by a coupling diode 38 to the first delay stage 36 while the base 35 of the transistor 34 is connected by a base-bias resistor 39 to the second time-delay stage 37.

In addition, the first delay capacitor 30 is bridged in series with the collector resistor 43 in parallel across the switching path 40 of a discharge transistor 41. In other words, the capacitor 30 is connected in parallel to the emitter-collector path 40 of the latter transistor.

The collector 42 of the discharge transistor 41 is connected via the collector resistor 43 to the junction between the current-limiting resistor 27, the Zener diode 28 and the first time-constant capacitor 30. In addition, this junction is also tied to the series network of two auxiliary resistors 44 and 45. The other end of this series network of resistors 44 and 45 is connected by a rectifier diode 46 to the second terminal of the secondary winding 7 of the current transformer 1.

The base 47 of discharge transistor 41 is connected to the junction between the auxiliary resistors 44 and 45 which thus constitute a voltage divider connected to this base.

Finally, a further storage capacitor 48 is provided which is connected on the one hand to the junction between the series network of resistors 44, 45 and the rectifier diode 46 and, on the other hand, to the terminal of the secondary winding 7 which is remote from the rectifier 46. Naturally, the circuit elements such as rectifiers 46 and 26 are duplicated for the two secondary windings 7 of the two current transformers.

4. Voltage-Supply Circuit

The circuit of the drawing also includes an improved and particularly effective voltage-supply network 4 which has been found to be especially advantageous in conjunction with the other improved parts of the overload-prevention system.

The voltage supply circuit 4 includes a rectifier diode 49, a storage capacitor 50 and a Zener diode connected in parallel to the storage capacitor 50. The rectifier diode 49 and the parallel network formed between the storage capacitor 50 and the Zener diode 51 are connected in series. The series circuit formed on the other hand by the rectifier diode and on the other hand by the parallel network of the storage capacitor 50 and the Zener diode 51, is connected to the secondary winding 7 of the current transformer 1.

In the circuit of the drawing, the various components can have the following values:

Bridge resistors 11 = 10 kiloohms
Zener diode 12 = 5.6 V Zener voltage
Rectifier diode 13 = 1 N 4004
Resistor 14 = 1.2 kiloohms
Resistor 15 = 1 kiloohm
Resistor 16 = 470 ohms
Storage capacitor 19 = 47 microfarad
Zener diode 20 = 15 V Zener voltage
Coupling diode 21 = 1 N 4004
Darlington circuit 23 = BC 107 A and 2 N 1613
Rectifier diode 26 = 1 N 4004
Current-limiting resistor 27 = 200 ohms Zener diode 28 = 8.2 V Zener voltage
Delay capacitor 30 = 100 microfarad
Delay capacitor 31 = 10 microfarad
Delay capacitor 32 = 10 kiloohms
Delay capacitor 33 = 100 kiloohms
Auxiliary transistor 34 = BC 107 A
Coupling diode 38 = 1 N 4004
Base-bias resistor 39 = 22 kiloohms
Discharge transistor 41 = BC 107 A
Collector resistor 43 = 100 ohms
Auxiliary resistor 44 = 33 kiloohms
Auxiliary resistor 45 = 4.7 kiloohms
Rectifier diode 46 = 1 N 4004
Storage capacitor 48 = 2 microfarad
Rectifier diode 49 = 1 N 4004
Storage capacitor 50 = 100 microfarad
Zener diode 50 = 22 V Zener voltage

B. OPERATION

1. Operation of the Actual-Value Current-Monitoring Circuit

In the actual-value current-monitoring circuit, the secondary current derived from the first secondary winding 6 of the current transformer 1 has an amplitude which is proportional to the actual value of the current through the corresponding winding of the monitor to be protected by the circuit. This secondary current traverses the resistor network 17 so that a voltage drop can be tapped therefrom to the bridge circuit 10. In other words, a voltage is applied across the terminals 18 of the bridge circuit 10 which is proportional to the secondary current in the winding 6 and hence to the actual value of the current traversing the protected motor winding. This voltage is tapped between the terminal 22 and the end of the reistor 14 which is remote from its connection to resistor 15.

The potentiometer 15 provides adjustment for a particular nominal current in conjunction with the selected tap 9 of the primary winding of the current traansformer 1.

As long as the actual value of the current lies below the preset nominal current (selected by the choice of tap 9 and finely adjusted by the trimmer potentiometer 15), the voltage at the bridge output 25 is negative so that no control current flows through the control path 24 of the Darlington circuit 23.

The voltage at the bridge output 25 of the bridge circuit 10 is, with reference to its polarity, the potential difference between, on the one hand, the potential at the junction between the Zener diode 12 and a bridge resistor 11 and, on the other hand, the potential between the junction between the bridge resistor 11.

When the actual value of the motor current exceeds the nominal value set by selection of the tap 9 and adjustment of the potentiometer 15, the potential at the bridge output 25 of the bridge circuit 10 goes positive, thereby rendering the control path 24 of the Darlington circuit 23 unblocked and connects the coil of relay 3 to the voltage supply circuit 4. The relay 3 open circuits the motor when the voltage supply circuit 4 develops the necessary potential.

The rectifier diode 13, the storage condenser 19 and the Zener diode 20 serve for rectification, smoothing and limiting the voltage applied to the bridge circuit 10. The coupling diode 21 prevents the discharge time-constant of the storage capacitor 19 from being dependent upon the setting of the potentiometer 15.

The overload switch 3 is formed, as previously indicated, as a relay although it can also be constituted as a fuse which is melted away or interrupted by the conduction of the final stage of the Darlington circuit. In any event, the overload switch 3 open circuits when the voltage supply circuit 4 reaches the requisite voltage and the Darlington circuit is conductive.

2. Prevention of Triggering by Starting Current

Electric motors, especially polyphase induction motors, have a starting current which can greatly exceed the nominal operating current at which protection for the motor is to be established. To prevent this starting current from triggering the overload-protection circuit, it is important that the circuit have limiting means for preventing shutdown of the motor during the brief interval in which the high starting current prevails.

When the electric motor is connected to the line-current source, a portion of the secondary current of the second secondary winding 7 of the current transformer flows via the rectifier diode 26 through the current-limiting resistor 27 and the Zener diode 28.

A voltage corresponding to the Zener voltage of the Zener diode 28 is thus applied to the first time-delay stage 36 of the delay network 29 since the delay stage 36 is connected in parallel to the Zener diode 28. Practically the entire voltage is applied across the resistor 32 and the voltage developed thereacross is applied via a coupling diode 38 to the second delay stage 37 consisting of the time-delay condenser 31 and resistor 33.

For a time period determined by the dimensioning of the current-limiting resistor 27, the Zener diode 28, the delay network 29 and the base-bias resistor 39, the auxiliary transistor 34 shortcircuits the control stretch 24 of the Darlington circuit so that the overload switch 3 cannot be enabled. During this period, therefore, a temporary overload, even if detected by the actual value current-monitoring circuit, will not disconnect the motor.

3. Reactivation

If, as a result of overloading, the overload switch 3 has been energized, the current transformer 1 is de-energized as the motor is cut off from the line. It is important that the circuit restore itself as quickly as possible into a motor-drive condition so that the circuit which disables the Darlington network during the starting current phase will again be effected. In other words, the delay condenser 30 of the first delay stage 36 must be discharged as rapidly as possible. This is the function of the switching path 40 of the discharge transistor 41 which lies in parallel to the capacitor 30 but in series with the collector resistor 43. The base 47 of the discharge transistor is connected via the first auxiliary resistor 44 to the junction of the current-limiting resistor 27, the Zener diode 28, the delay capacitor 30 of the collector resistor 43. The discharge transistor 41 cannot be rendered conductive when the overload switch 3 is not open circuited. The base 47 of the discharge transistor 41 receives a negative voltage via the rectifier diode 46 and the auxiliary resistor 45. If the overload switch 3 is open circuited, the negative voltage is removed from the base 47 of the discharge transistor 41 so that the transistor 41 conducts and rapidly drains the capacitor 30 through the collector resistor 43.

4. The Voltage-Supply Network

The voltage-supply network 4 operates in an extremely simple manner. A part of the secondary current from the second secondary winding 7 of the current transformer 1 flows via the rectifier diode 49 to the storage capacitor 50 so that the desired voltage always appears across the storage condenser 50 limited by the breakdown voltage of the Zener diode 51.

It should be noted further that the rectifier diode 13 in circuit with the first secondary winding 6 of the current transformer 1, on the one hand, and the rectifier diode 49 in circuit with the second secondary winding 7 of the current transformer 1, on the other hand, are provided in oppositely poled or antiparallel relationship so that during one half cycle the first secondary winding 6 generates a secondary current while in the second half cycle, the secondary current appears in the second secondary winding 7 of the current transformer 1.

We claim:

1. An overload-prevention circuit arrangement for an electric motor, comprising:
   a current transformer having at least one primary winding formed with a multiplicity of winding sections each having a respective tap for a given nominal current value of protection for said motor, said taps being selectively connectable to said motor in accordance with the nominal maximum running current thereof, the product of the number of turns of each section and the nominal-current value of the respective tap being the same for all of said section, said transformer further including a first secondary winding and a second secondary winding inductively coupled to said primary winding;
   an actual-value current-monitoring circuit connected to said first secondary winding;
   switch means connected to said current-monitoring circuit for open-circuiting said motor upon the detection by said current-monitoring circuit of an actual motor current exceeding the nominal-current value of the tap to which said motor is connected; and
   a voltage-supply network for said switch means connected to said second secondary winding.

2. The circuit arrangement defined in claim 1 wherein said current transformer is so constructed and arranged that it has a substantially linear relation between the field strength and induction over a range between 50% and 100% of the nominal current of the tap to which said motor is connected.

3. The circuit arrangement defined in claim 1 wherein said current-monitoring circuit includes a bridge network of three bridge resistors and a Zener diode.

4. The circuit arrangement defined in claim 3 wherein said current-monitoring circuit further comprises a resistor network in series with a rectifier diode connected across said first secondary winding, said bridge having input terminals connected across a portion of said resistor network.

5. The circuit arrangement defined in claim 4, further comprising a storage capacitor connected across said input terminals of said bridge.

6. The circuit arrangement defined in claim 4, further comprising a Zener diode connected across the input terminals of said bridge.

7. The circuit arrangement defined in claim 4, further comprising a coupling diode connected between said resistance network and one of the input terminals of said bridge.

8. The circuit arrangement defined in claim 4 wherein said current-monitoring circuit further includes a control transistor in circuit with said switch means and connected to said bridge.

9. The circuit arrangement defined in claim 4 wherein said current-monitoring circuit includes a Darlington circuit connected to output terminals of said bridge for operating said switch means, said Darlington circuit having a control stretch.

10. The circuit arrangement defined in claim 9, further comprising an auxiliary transistor having its emitter-collector path connected across said control stretch, a rectifier diode connected in series with a current-limiting resistor and a Zener diode across said second secondary winding, and a time-constant network connected between the base of said auxiliary transistor and the junction between said current-limiting resistor and a Zener diode in series therewith so that when said auxiliary transistor is conductive, said switch means is blocked from operation.

11. The circuit arrangement defined in claim 10 wherein said time-constant network comprises two time delay stages, a first of said stages including a delay capacitor and a delay resistor in series, the other stage including a second delay capacitor and a second delay resistor connected in parallel to said second delay capacitor, said second stage being connected by a coupling diode to said first stage, the base of said auxiliary transistor being connected by a base-bias resistor to said second stage.

12. The circuit arrangement defined in claim 11, further comprising a discharge transistor having its emitter-collector path connected in shunt across the first-mentioned delay capacitor.

13. The circuit arrangement defined in claim 4 wherein said voltage supply means includes a rectifier diode connected in series with a storage capacitor across said second secondary winding and a Zener diode bridged across said storage capacitor.

* * * * *